Sept. 15, 1942.   O. D. TAYLOR   2,295,764
BREAD SLICING MACHINE
Filed Nov. 12, 1940   5 Sheets-Sheet 2

Orlin D. Taylor INVENTOR.
BY
A. G. Burns ATTORNEY.

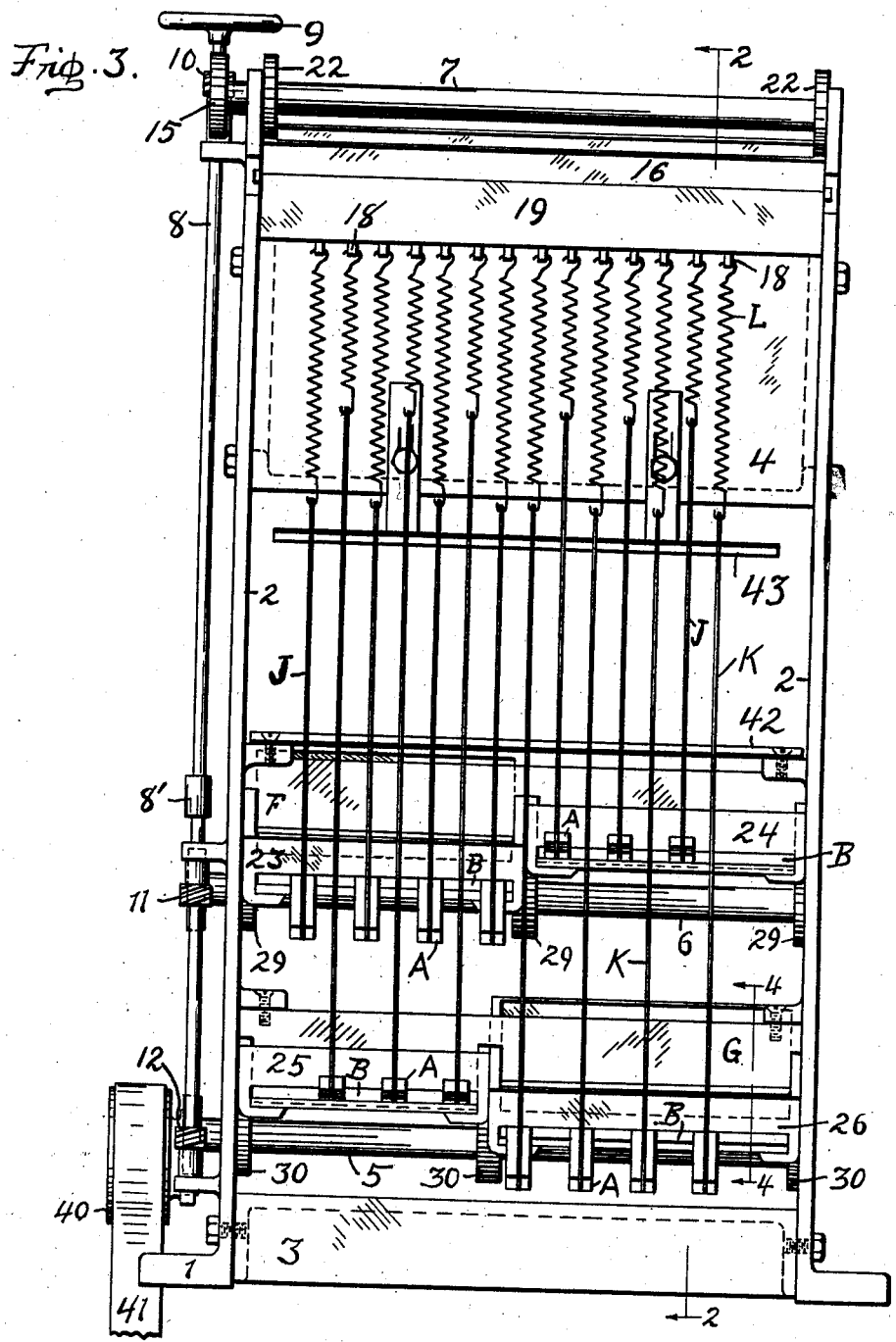

Sept. 15, 1942.   O. D. TAYLOR   2,295,764
BREAD SLICING MACHINE
Filed Nov. 12, 1940   5 Sheets-Sheet 4
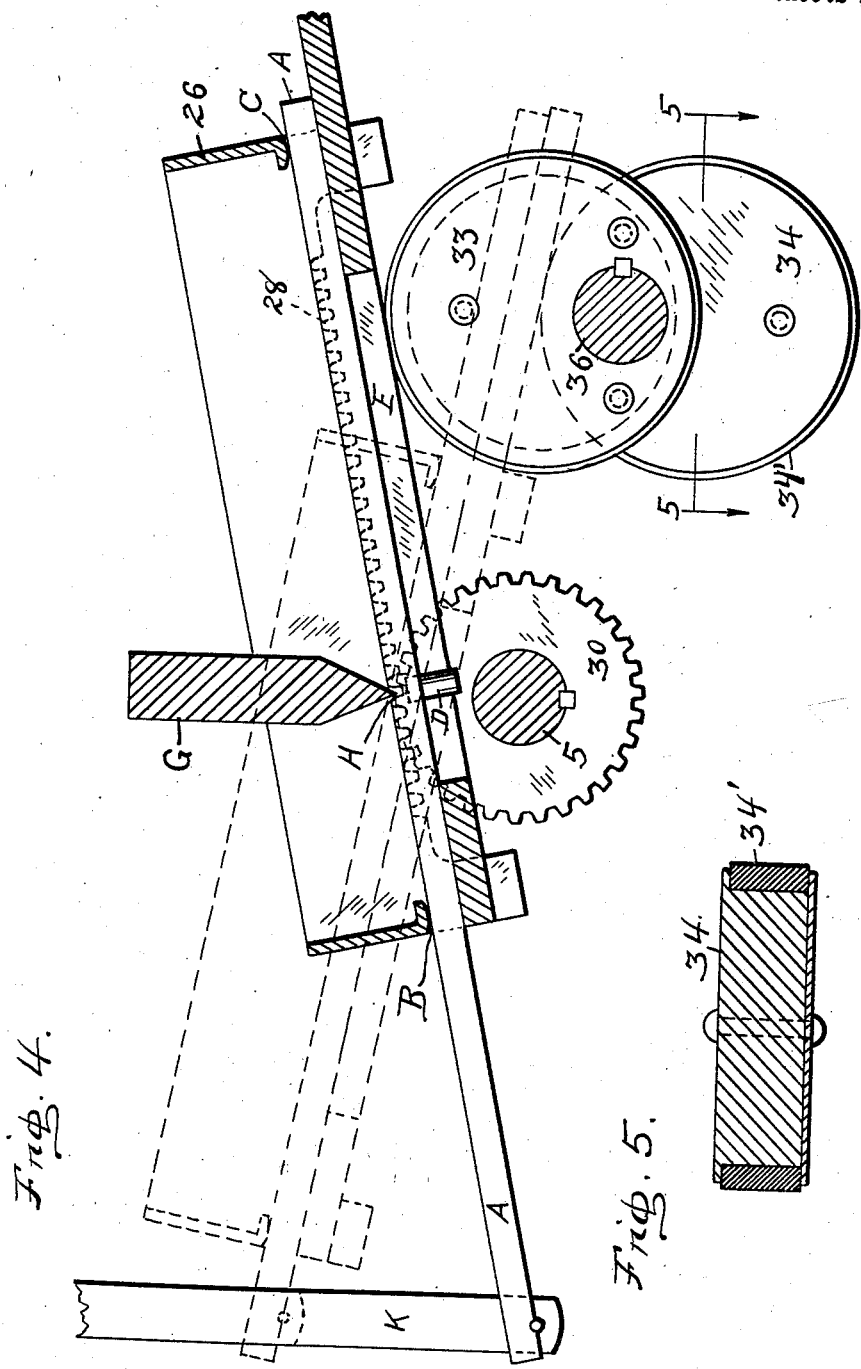
INVENTOR.
Orlin D. Taylor.
BY
H. G. Burns   ATTORNEY.

Sept. 15, 1942.　　　　O. D. TAYLOR　　　　2,295,764
BREAD SLICING MACHINE
Filed Nov. 12, 1940　　　5 Sheets-Sheet 5

INVENTOR.
Orlin D. Taylor
BY
ATTORNEY.

Patented Sept. 15, 1942

2,295,764

UNITED STATES PATENT OFFICE 2,295,764

BREAD SLICING MACHINE

Orlin D. Taylor, Bluffton, Ind.

Application November 12, 1940, Serial No. 365,239

6 Claims. (Cl. 146—153)

This invention relates to bread slicing machines wherein a group of reciprocating knives are arranged in a machine in parallel relation with each other and adjustably spaced apart so that when the alternate knives are actuated in opposite directions and a loaf of bread is fed to the machine, the entire loaf is severed by the actuated knives into numerous slices of uniform thickness without distortion of the loaf.

An object of the invention is to provide an improved means for adjustably positioning a group of knives in positions spaced apart, equidistant from each other, whereby to deliver from the machine a loaf of bread that is pre-sliced in conformity to a predetermined gauge.

Another object of the invention is to provide in a bread slicing machine having a group of knives, an adjustable mechanism in connection with said knives whereby to conveniently and accurately move said knives into a desired uniformly spaced relation with each other thereby to vary the thicknesses of the slices.

A further object of the invention is to provide mechanism for uniformly spacing apart the knife connections adjustably and so constituted as to be actuated during operation of the machine.

Other objects and advantages of the invention appear in the following description.

An illustrative embodiment of the invention is shown in the accompanying drawings, in which:

Fig. 3 is a view showing a front elevation of the appliance;

Fig. 4 is a transverse cross-sectional view showing parts of the operating mechanism for actuating the knives, the section being on the line 4—4 of Fig. 3;

Fig. 5 is a detail sectional view of one of the operating cam members on the line 5—5 of Fig. 4.

Figure 1:
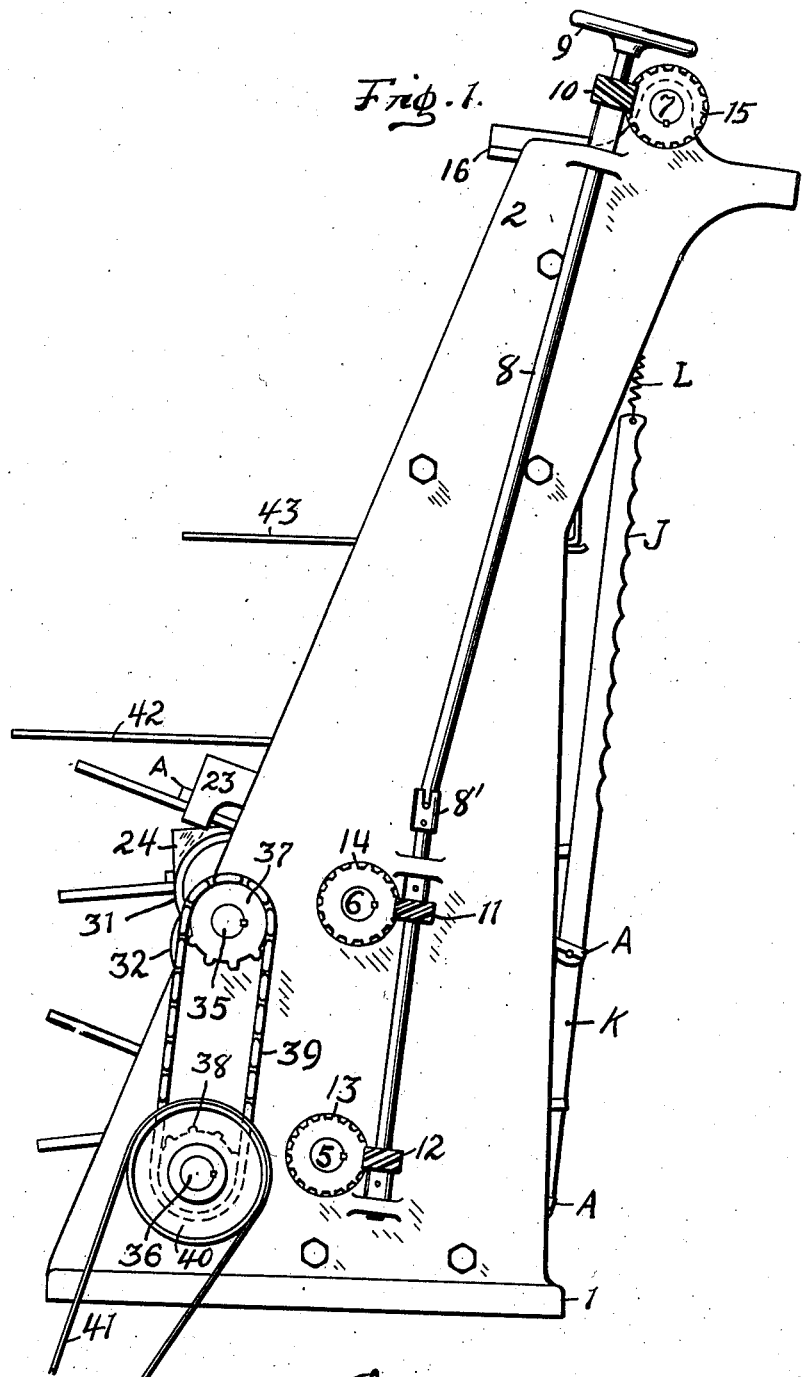
Fig. 1 is an end elevation of a structure in which the invention is incorporated.
Figure 2:
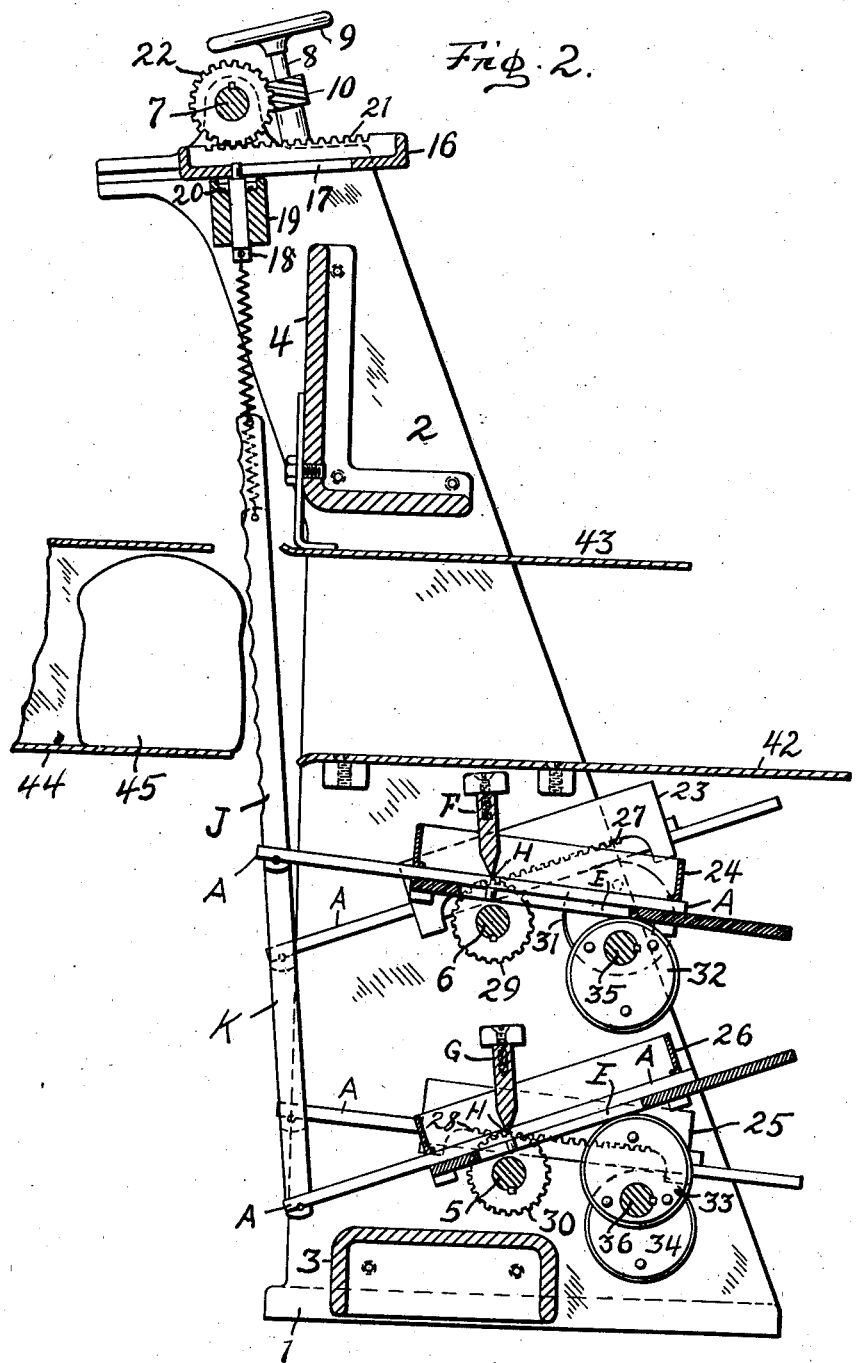
Fig. 2 is a vertical sectional view showing the relative arrangement of parts.

The illustrative embodiment of the invention consists of a frame constituted of a base 1, standards 2 and cross members 3 and 4. Mounted in the standards are adjusting shafts 5, 6 and 7 that are rotatively moved adjustably in unison by means of an operating shaft 8 which is provided with a hand-wheel 9 and worms 10, 11 and 12 having engagement respectively with worm-wheels 13, 14 and 15 keyed on the adjusting shafts 5, 6 and 7. Preferably, the operating shaft 8 is made in two sections connected by a universal coupling 8'.

Figure 6:
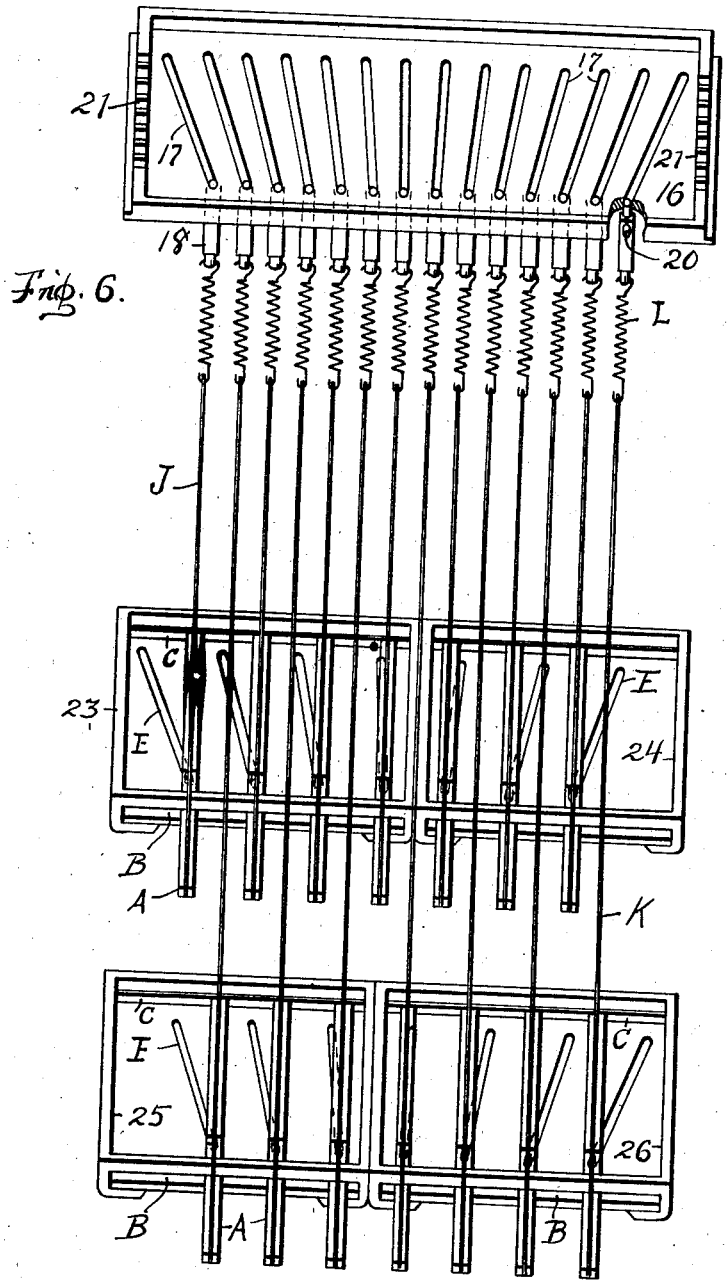
Fig. 6 is a diagrammatical view showing the arrangement of the several gauge plates that form parts of the mechanism for controlling the thickness of the bread slices to be made.

In the uppermost part of the frame is mounted for forward and backward sliding movement therein a gauge-plate 16 that has a group of divergent guide-slots 17 (Fig. 6) into which project corresponding laterally slidable studs 18 located in a slotted guide-rail 19 that is disposed transversely in the frame. Each stud has a cross pin 20 with its ends extending in the slotted guide-rail whereby to prevent downward movement of the studs. Upon movement of the gauge-plate, said studs are uniformly spaced apart from each other more or less accordingly.

The gauge-plate 16 has on each end thereof a toothed rack 21 that is engaged by a corresponding gear 22 which is keyed on the adjusting shaft 7 whereby the gauge-plate is adjustably moved forward or backward to an extent accordingly as said shaft is turned, and thus the studs 18 are automatically adjusted.

In the lower portion of the frame are arranged two pairs of rock-members 23—24 and 25—26, the one pair being located above the other, each rock-member having at both of its ends a toothed rack 27—28 that meshes with corresponding gears 29—30 secured respectively on the adjusting shafts 6 and 5 so that the rock-members are adjustably moved forward or backward accordingly as said shafts are turned. The rear portions of the rock-members are supported on corresponding cams 31—32 and 33—34, said cams being secured in oppositely disposed pairs on corresponding drive-shafts 35—36.

Upon one end of each drive-shaft is secured a sprocket-wheel 37—38, which sprocket-wheels are connected by a transmission chain 39, and the shaft 36 has secured thereon a drive-wheel 40 that is actuated by a belt 41 so that the drive-shafts are concurrently turned in unison and the rock-members of each pair respectively are caused to have rocking movement in relative opposite directions upon their corresponding common horizontal axis.

The rock-members have therein corresponding groups of knife-actuating levers A that project loosely through horizontally elongated openings B and C made in the front and rear walls of the rock-members, and said levers have corresponding pendant studs D that project respectively into individual guide-slots E that are made in the bottom plate of each rock-member. These guide-slots are disposed in groups and extend rearwardly and radially toward the outer ends of the corresponding rock-members. The angularity of the individual guide-slots are of increased angularity progressively from the innermost guide-slot to the outermost. When the operating levers are properly arranged in their respective rock-members they are held from forward and backward movement by corresponding fulcrum bars F—G that are secured transversely in the frame of the machine. Each fulcrum bar is knife-edged along its bottom and projects into transverse slots H that are made in the upper faces of the actuating levers at points thereon equidistant from their forward ends and traverse the axes of the studs D. In this manner angular turning movement of said levers with respect to said axes is prevented and lateral movement of the levers in their rock-members parallel with the knife edges of the fulcrum is permitted. The rock-members have adjustable forward and backward movement relative to the levers when the adjusting shafts 5 and 6 are turned, and when so moved the levers become uniformly spread apart from each other due to the varying angularity of the individual guide-slots and the engagement of the studs therein. For instance, when the rock-members are adjustably moved to their rearmost positions the levers are moved into close formation, and when the rock-members are moved forwardly the levers are moved comparatively further apart.

The guide-slots in the several rock-members are so positioned that the knife-actuating levers in the upper rock-members 23—24 are held in vertical planes that are spaced alternately with the levers in the lower rock-members 25—26.

Two groups of knives J and K of different length are removably connected at their lower ends individually to the outer ends of the actuating levers, the shorter blades being attached to the levers in the upper groups while the longer knives are attached to the levers in the lower groups. All of the knives are connected at their upper ends respectively to the slidable studs 18 by means of corresponding tension springs L of suitable length to retract the downward strokes of the knives that are imparted thereto by the action of the rock-members and levers.

Preferably, the cams and the two groups of knives are so arranged and connected up with their related operating parts that the strokes of the alternate knives are in opposite directions during operation of the machine.

Between the standards 2 is secured a stationary table plate 42 disposed in horizontal position, and a cover plate 43 is adjustably secured in connection with the cross member 4 in a selected horizontal position spaced above the table plate. The forward edges of said plates terminate back of the knives suitable distances to afford clearance for the knives while operating and during lateral adjustment thereof, and a feed chute 44 is located in front of the knives in open alinement with the space between the table and cover plates so that a loaf 45 of bread may be thrust through the moving group of knives onto the table plate. In this manner the loaf is severed into slices of a uniform thickness that is variable accordingly as the blades are adjusted laterally apart.

In operation of the machine, due to the tension of the springs L, the knife actuating levers are held up against their respective fulcrums, and the rock-members bear down upon the cams, and preferably to obviate objectionable friction between the cams and the rock-members, the cams are provided with peripheral friction rings 34' that are secured loosely thereon to take up wear.

Upon rotation of the drive-wheel the rock-members are set in motion causing lengthwise reciprocating movement of the knives, the upstrokes of the alternate knives being concurrent with the downstroke of the intervening knives thus to neutralize the up and down drag of the blades upon the loaves as they are sliced. The loaves are fed through the chute one after another so that the preceding loaf is shoved through the knives by pressure of the succeeding loaves, and as they become sliced, are moved onto the table plate from which they are readily removed bodily to be wrapped in a suitable covering ready for delivery. The thickness of the slices is regulated by adjustably turning the hand-wheel 9 which causes widening or narrowing of the spaces between the knives according to the direction in which the hand-wheel is turned.

Variations from the particular construction above disclosed may readily be made by exercise of engineering skill without departure from the spirit or scope of the invention, and the following claims are intended to be inclusive of such variations.

What I claim is:

1. A bread slicer consisting of a frame, a gauge-plate mounted transversely in the frame to have forward and backward adjusting movement provided with radially arranged gauge-slots, a stationary guide-rail secured transversely in the frame adjacent said gauge-plate, studs supported in said guide-rail adapted to have lateral adjustable movement therein and having engagement respectively with said gauge-slots correspondingly wherefore to be moved upon adjustment of said gauge-plate, a pair of rock-members mounted in the frame to have tilting movement upon a common transverse axis therein and provided with radial guide-slots, a second similar pair of rock-members likewise mounted in the frame for tilting movement upon a second transverse axis therein, adjusting mechanism operatively connected with said gauge-plate and rock-members adapted to impart forward and backward movement thereto simultaneously to a like extent, a group of knife-actuating levers in each of said rock-members upon which said rock-members are adjustably movable, transverse fulcrum bars having engagement with the corresponding groups of levers adapted to prevent longitudinal movement of said levers and permit lateral adjustment thereof relative to said bars, tension springs connected respectively with said slidable studs, knives connected with said springs respectively at one of their ends and at their opposite ends to said levers wherefore reciprocating movement is imparted to the knives when said rock-members are actuated, driving mechanism in connection with said rock-members arranged so as to actuate the rock-members of each pair thereof in opposite directions, and means for directing loaves to the knives and receiving the sliced loaves therefrom.

2. In a bread slicer, a frame and mechanism supported therein for slicing loaves, said mechanism consisting of an adjustable gauge-plate, a stationary guide-rail, studs in said guide-rail operatively connected with said gauge-plate to be adjustably moved laterally thereby, a pair of rock-members angularly movable and adjustable upon a common axis, a second similar pair of rock-members angularly and adjustably movable upon a second axis, said members having radial slots therein, levers operatively connected with said members and engaged with the slots therein, a stationary fulcrum bar for the levers in each pair of members adapted to prevent longitudinal and permit lateral movement thereof, mechanism operatively connected with said gauge-plate and said rock-members wherefore to simultaneously adjust same thus to cause lateral adjustment of said studs and levers, knives connected at one of their ends respectively with said levers and having tension-spring connections at their opposite ends with said studs correpondingly, driving means constituted and arranged in connection with said rock-members so as to actuate said members oppositely, and means for directing loaves to the knives and receiving the sliced loaves therefrom.

3. In a bread slicer, a frame structure, a group of laterally adjustable studs in said structure, a movable gauge-plate operatively connected with said studs wherefore to adjust same, adjustable rock-members disposed in said structure to have tilting movement in opposite directions, knife-actuating levers and fulcrums for same disposed in said structure and arranged in connection with said rock-members to be actuated thereby, an adjusting mechanism in connection with said gauge-plate and rock-members for adjustably moving same simultaneously, driving mechanism for actuating said rock-members including cams so arranged and engaged with said rock-members as to actuate said rock-members in opposite directions, retracting means in connection with said studs respectively, knives connected respectively at one of their ends with the corresponding springs and at their opposite ends with said levers respectively, and means for directing loaves to the knives and receiving sliced loaves therefrom.

4. In a bread slicer, a frame structure, laterally movable studs supported in said structure, a gauge-member operatively connected with said studs for adjustably spreading and contracting same, rock-members disposed in said structure having tilting movement, knife-actuating levers disposed in said rock-members upon which said rock-members are adjustably movable longitudinally with respect to said levers, stationary fulcrums engaging said levers in a manner to prevent longitudinal and permit lateral movement of said levers, knives connected respectively at one of their ends with said levers correspondingly and provided at their opposite ends with tension spring connections correspondingly with said studs, adjusting means operatively connected with said gauge-member and rock-members for imparting forward and back movement thereto collectively, said rock-members having radial guide-slots, means on said lever engaged in said slots, wherefore lateral adjusting movement is imparted to said levers upon forward or back movement of said rock-members, actuating mechanism for said rock-members having oppositely disposed cams upon which said rock-members bear and are tilted in opposite directions upon rotation of said cams, and means for directing loaves to the knives and receiving sliced loaves therefrom.

5. In a slicing machine, a frame structure having laterally adjustable knife-supporting members and means for adjusting same, knives having tension spring connections with said members, actuating means for said knives including rock-members having radial guide-slots and provided with knife-actuating levers having studs engaged in said guide-slots respectively, stationary fulcrums each having a knife-edge that engages in transverse slots in the corresponding levers and which traverse the axes of said studs, means for adjusting said rock-members longitudinally with respect to said levers wherefore to spread or contract said levers relative to each other, and mechanism for imparting movement to said rock-members in opposite directions.

6. In a slicing machine having parallel reciprocating knives provided with tension supports therefor and means for laterally adjusting said supports, actuating means for said knives including rock-members having radial guide-slots and levers mounted therein provided respectively with studs engaged in said guide-slots and having connections respectively with said knives, stationary fulcrums engaging said levers in a manner to prevent longitudinal and permit lateral movement of said levers, and driving mechanism in connection with said rock-members for actuating said rock-members oppositely.

ORLIN D. TAYLOR.